United States Patent
Farooq et al.

(10) Patent No.: US 12,264,928 B2
(45) Date of Patent: Apr. 1, 2025

(54) DISTRIBUTED TRAFFIC MANAGEMENT SYSTEM WITH DYNAMIC END-TO-END ROUTING

(71) Applicants: Bilal Farooq, Toronto (CA); Shadi Djavadian, Toronto (CA)

(72) Inventors: Bilal Farooq, Toronto (CA); Shadi Djavadian, Toronto (CA)

(*) Notice: Subject to any disclaimer, the term of this patent is extended or adjusted under 35 U.S.C. 154(b) by 520 days.

(21) Appl. No.: 17/618,296

(22) PCT Filed: Jun. 24, 2020

(86) PCT No.: PCT/CA2020/050875
§ 371 (c)(1),
(2) Date: Dec. 10, 2021

(87) PCT Pub. No.: WO2020/257926
PCT Pub. Date: Dec. 30, 2020

(65) Prior Publication Data
US 2022/0316900 A1    Oct. 6, 2022

Related U.S. Application Data

(60) Provisional application No. 62/865,725, filed on Jun. 24, 2019.

(51) Int. Cl.
*G01C 21/34*    (2006.01)
*G01C 21/36*    (2006.01)
(Continued)

(52) U.S. Cl.
CPC ..... *G01C 21/3492* (2013.01); *G01C 21/3691* (2013.01); *G08G 1/0116* (2013.01); *G08G 1/0137* (2013.01); *H04W 4/44* (2018.02)

(58) Field of Classification Search
CPC . G01C 21/3492; G01C 21/3691; H04W 4/44; G08G 1/0116; G08G 1/0137
See application file for complete search history.

(56) References Cited

U.S. PATENT DOCUMENTS

| | | |
|---|---|---|
| 6,351,707 B1 | 2/2002 | Ichikawa |
| 8,103,435 B2 | 1/2012 | Yang et al. |
| (Continued) | | |

FOREIGN PATENT DOCUMENTS

| | | |
|---|---|---|
| JP | 2010-203796 A | 9/2010 |
| WO | 2007/008837 A2 | 1/2007 |

OTHER PUBLICATIONS

Djavadian S., Farooq B. 'Distributed Dynamic Routing Using Network of Intelligent Intersections'. In: Intelligent Transportation Systems Canada Annual Conference & General Meeting 2018, (ITS Canada ACGM) Niagara Falls, Jun. 18, 2018.
(Continued)

*Primary Examiner* — Hussein Elchanti

(57) ABSTRACT

There is provided a decentralized system and method for distributed traffic management comprising: a plurality of intersection computing agents connected across a communication network, each intersection computing agent located at a particular intersection communicating with a plurality of corresponding local link computing agents comprising sensors located on each respective road link directly connected to the particular intersection, to receive a link status report comprising speed and number of vehicles on said each respective road link; and said each intersection computing agent calculating an estimated travel time for said each respective road link from said link status report and receiving link information packet comprising the estimated travel time for said each respective road link from a first plurality of intersection computing agents located at a first plurality of intersections physically located downstream to create a network travel time matrix for routing vehicles at said particular intersection.

17 Claims, 8 Drawing Sheets

(51) Int. Cl.
*G08G 1/01* (2006.01)
*H04W 4/44* (2018.01)

(56) References Cited

U.S. PATENT DOCUMENTS

| | | | | |
|---|---|---|---|---|
| 8,700,299 | B2* | 4/2014 | Morita | G08G 1/096716 701/123 |
| 10,365,115 | B2* | 7/2019 | Nair | G08G 1/0145 |
| 11,069,234 | B1* | 7/2021 | Mulligan | G08G 1/087 |
| 11,237,554 | B2* | 2/2022 | Rezaeian | G06F 3/013 |
| 2005/0104745 | A1* | 5/2005 | Bachelder | G08G 1/01 340/988 |
| 2005/0187701 | A1* | 8/2005 | Baney | G08G 1/096716 340/907 |
| 2009/0167561 | A1* | 7/2009 | Liang | G08G 1/095 340/907 |
| 2009/0287401 | A1* | 11/2009 | Levine | G08G 1/096805 701/117 |
| 2010/0030458 | A1* | 2/2010 | Coughlin | B60W 40/09 701/123 |
| 2010/0082190 | A1* | 4/2010 | Jinno | B60K 6/52 903/918 |
| 2010/0171640 | A1* | 7/2010 | Delia | G08G 1/07 340/907 |
| 2010/0308986 | A1* | 12/2010 | Dobryden | G08C 17/02 340/439 |
| 2011/0043348 | A1* | 2/2011 | Blackard | F16H 63/42 340/439 |
| 2011/0126797 | A1* | 6/2011 | Russell | F02D 19/0692 123/294 |
| 2014/0336913 | A1* | 11/2014 | Fino | G08G 1/096844 701/465 |
| 2015/0145995 | A1* | 5/2015 | Shahraray | H04W 4/70 348/148 |
| 2015/0154860 | A1* | 6/2015 | Holzwanger | G08G 1/005 340/944 |
| 2016/0148507 | A1* | 5/2016 | Pittman | G06Q 30/0255 340/917 |
| 2016/0358463 | A1* | 12/2016 | Cho | G08G 1/0145 |
| 2017/0124868 | A1* | 5/2017 | Bhat | G08G 1/09623 |
| 2017/0154525 | A1* | 6/2017 | Zou | G08G 1/095 |
| 2018/0075739 | A1* | 3/2018 | Ginsberg | G08G 1/096816 |
| 2018/0151064 | A1* | 5/2018 | Xu | G08G 1/0125 |
| 2018/0157258 | A1* | 6/2018 | O'Brien | G05D 1/0088 |
| 2018/0253968 | A1* | 9/2018 | Yalla | G08G 1/097 |
| 2018/0261083 | A1* | 9/2018 | Sun | G08G 1/012 |
| 2018/0286228 | A1* | 10/2018 | Xu | G08G 1/0145 |
| 2019/0082377 | A1* | 3/2019 | Silver | G08G 1/096741 |
| 2019/0086219 | A1* | 3/2019 | Hashisho | G05D 1/0223 |
| 2019/0122178 | A1* | 4/2019 | Kempf | G06Q 10/063114 |
| 2019/0122548 | A1* | 4/2019 | Sakuma | G08G 1/08 |
| 2019/0180617 | A1* | 6/2019 | Hori | B60W 50/0097 |
| 2019/0228593 | A1* | 7/2019 | Liu | G08G 1/096872 |
| 2019/0272747 | A1* | 9/2019 | Raamot | G08G 1/0129 |
| 2020/0184238 | A1* | 6/2020 | Kobayashi | G06V 40/161 |

OTHER PUBLICATIONS

Alfaseeh, L., Djavadian, S., Farooq, B. "Impact of Distributed Routing of Intelligent Vehicles on Urban Traffic," in ITS Canada ACGM 2018, Niagara Falls, Jun. 17-20, 2018.

Alfaseeh L, Djavadian S, Farooq B. Impact of Distributed Routing of Intelligent Vehicles on Urban Traffic. In: fourth IEEE International Smart Cities Conference. Kansas City; Sep. 17, 2018.

Tu, R., Alfasseh, L., Djavadian, S., Farooq, B., Hatzopoulou M. "Quantifying the impacts of dynamic control in connected and automated vehicles on greenhouse gas emissions and urban NO2 concentrations". In: Transportation Research Part D. 73 (2019) pp. 142-151.

Djavadian, S., Farooq, B., Vasquez, R., Yip, G. "Chapter 27—Virtual immersive reality based analysis of behavioural responses in connected and autonomous vehicle environment". Editor(s): Konstadinos G. Goulias, Adam W. Davis, Mapping the Travel Behavior Genome, Elsevier, 2020, pp. 543-559, ISBN 9780128173404, https://doi.org/10.1016/B978-0-12-817340-4.00027-9. (https://www.sciencedirect.com/science/article/pii/B9780128173404000279).

Winnik, A. International Search Report in PCT/CA2020/050875. Sep. 2, 2020. 4 pages.

Winnik, A. Written Opinion of the International Searching Authority in PCT/CA2020.050875. Sep. 2, 2020. 6 bages.

Tu, R., Alfasseh, L., Djavadian, S., Farooq, B., Hatzopoulou M. "Can End-to-End Dynamic Routing Control in Connected Autonomous Vehicles Deliver Benefits to GHG Emissions, Air Quality and Energy?". In: Transportation Research Board Annual Meeting, Jan. 16, 2019, Washington D.C.

Wuthishuwong, C. Traechtler, A; Coordination of multiple autonomous intersections by using local neighborhood Information. In2013 international conference on connected vehicles and expo (ICCVE) Dec. 2, 2013 (pp. 48-53). IEEE. Abstract; Section II—Section IV.

\* cited by examiner

DISTRIBUTED TRAFFIC MANAGEMENT SYSTEM WITH DYNAMIC END-TO-END ROUTING

This application is a national stage application pursuant to 35 U.S.C. § 371 of PCT Application No. PCT/CA2020/050875 having an international filing date of Jun. 24, 2020, which designated the United States, from which the PCT application claimed the benefit of U.S. Provisional Patent Application No. 62/865,725 filed Jun. 24, 2019, the entire contents of which are incorporated herein by reference. The present disclosure relates to a dynamic distributed traffic management system and method, and more particularly to a traffic management system that manages traffic flow using a network of intelligent intersection computing devices for dynamic and real-time routing to users.

TECHNICAL FIELD

The present disclosure relates to a dynamic distributed traffic management system and method, and more particularly to a traffic management system that manages traffic flow using a network of intelligent intersection computing devices for dynamic and real-time routing to users.

BACKGROUND

The rise in private vehicle ownership has led to three major problems facing transportation system: sky-high congestion and accident rates as well as environmental pollution. The advent of connected and automated vehicles (CAVs) that can communicate with each other and/or road infrastructure (e.g. intersections) provides a range of new options to manage congestion, increase safety and save environment.

In recent years, there have been some focus on providing distributed dynamic routing using vehicle-to-vehicle communication or crowd-sourced traffic navigation devices such as GPS navigation software app WAZE™, which can be installed on smartphones and tablet computer having GPS support. Generally speaking, the efficiency of the distributed routing system using vehicle to vehicle (V2V) communication or crowdsourced traffic navigation devices such as WAZE™ is hindered by at least three factors namely: (a) market penetration rate; (b) communication range; and (c) individualistic behavior of the drivers. In effect, since each vehicle in such systems does not have the full view of the traffic state of the network or the prevailing conditions in the network, they estimate the network state based on the locally exchanged information. As such, communication range and market penetration play an integral part in the success of V2V routing. In addition, since drivers are the sole decision makers in the case of V2V route guidance, the chosen routes are user optimal routes rather than system optimal routes.

The majority of the current literature aims at providing en-route routing to either Human Driven Vehicles (HDVs) or Connected Vehicles (CVs) by obtaining real traffic conditions either through vehicle-to-vehicle communication (V2V), vehicle-to-centralized controller communication (V2C) or using vehicle probes. The centralized controller in such cases is typically setup such that (a) a vehicle is autonomously controlling the route via information gathered by it (b) a centralized controller gathering the traffic information and is providing route guidance to individual vehicles. However, the accuracy of such implementations depends on the number of vehicles on the road with sensing capability (market penetration rate).

Therefore, it is desired to provide an improved dynamic and distributed traffic management system and method that is decentralized and obviates or mitigates at least some or all of the above disadvantages.

SUMMARY

Accordingly, the present invention is directed to a distributed dynamic traffic management system and method based on a distributed network of intelligent intersection computing agents located at or proximate to road intersections that communicate with one another and utilize input received from local road links (e.g. road sensors and/or cameras and/or imaging devices) coming into each intersection to provide end-to-end dynamic routing to vehicles arriving at each intersection in real-time with regards to the overall network.

In at least some embodiment of the disclosed system and method for distributed dynamic traffic management using a distributed network of intelligent intersection computing agents, the following one or more advantages are provided:
  Reliable and up-to-date traffic information along with single integrated and coherent view of the network;
  Responsive to real time changes in the transportation system;
  Capable of achieving cooperation and coordination among vehicles due to having fully automated and connected vehicles that are controlled by intelligent intersections (e.g. intelligent intersection computing devices or agents);
  Distributes traffic in the network in such a way that maximizes capacity and minimizes travel time;
  Can be used for distributed ride-sharing services, generally outperforming centralized ride-sharing services in terms of wait time;
  Can reduce greenhouse gas emissions by improved efficiency and accuracy of route management.

In one embodiment, there is provided a computing system comprising: a plurality of intersection computing agents, each having a processor and a memory, communicatively connected across a communication network, each intersection computing agent physically located at a particular intersection of a road communicating with a plurality of corresponding local link computing agents comprising one or more sensors located on each respective road link directly physically connected to the particular intersection, to receive from the local link computing agent a link status report comprising traffic information for each respective road link; and each of the intersection computing agents calculating an estimated travel time for each the respective road link from said link status report and receiving link information packet comprising the estimated travel time for said each respective road link from a first plurality of intersection computing agents located at a first plurality of intersections physically located downstream from the particular intersection to create a network travel time matrix for routing vehicles at the particular intersection.

In another embodiment, there is provided an intelligent intersection computing agent associated with an intersection for facilitating distributed dynamic traffic management, the intelligent intersection computing agent comprising: a processor, a communication subsystem and a memory, the communication subsystem and the memory each in communication with the processor, the memory storing instructions, which when executed by the processor, configure the intelligent intersection computing agent to: broadcast a presence of the intelligent intersection computing agent at the intersection to one or more other intelligent intersection computing agents located at one or more neighboring intersections; receive at predefined time intervals, link information providing a link status report comprising an average speed of a link for each local link connected to the intersection from a set of link computing agents comprising sensors for detecting vehicles on each said local link; determine a first average estimated travel time for each the local link from the link information; receive, in response to the broadcast, from selected ones of the other intelligent intersection computing agents and located downstream of the intersection at one or more downstream intersections, a second average estimated travel time for downstream links associated with each the downstream intersection; and calculate a routing table providing a route from the intersection to each one of the neighboring intersections based on the first estimated average travel time and the second average estimated travel time.

In another embodiment, there is provided a computer implemented method for facilitating distributed dynamic traffic management, comprising: broadcasting a presence of an intelligent intersection computing agent at an intersection to other intelligent intersection computing agents located at one or more neighboring intersections; receiving at predefined time intervals, link information providing a link status report comprising average speed of a link for each local link connected to the intersection from a set of link computing agents comprising sensors for detecting vehicles on each the local link; determining a first average estimated travel time for each the local link from the link information; receiving, in response to the broadcast, from the other intelligent intersection computing agents located downstream of the intersection at one or more downstream intersections, a second average estimated travel time for downstream links associated with each the downstream intersection; and calculating a routing table providing a route from the intersection to each one of the one or more neighboring intersections based on the first estimated average travel time and the second average estimated travel time.

BRIEF DESCRIPTION OF THE DRAWINGS

These and other features of the invention will become more apparent from the following description in which reference is made to the appended drawings wherein.

While references to "an embodiment" are used herein, nothing should be implied or understood that features of one embodiment cannot be used or combined with features of another embodiment unless otherwise stated. The various systems, methods and devices shown and described herein may be used together unless otherwise stated.

DETAILED DESCRIPTION

Reference will now be made in detail to embodiments of the present disclosure, examples of which are illustrated in the accompanying drawings. Wherever possible, the same reference numbers will be used throughout the drawings to refer to the same or like parts.

The present disclosure discloses a distributed system and method for dynamic traffic management in which, in at least some embodiments, each individual controller computing device (e.g. also referred to as an intelligent intersection computing agent) can make decisions independently based on their global, complete and consistent view of the traffic conditions. Preferably, distributed controllers (e.g. intelligent intersection computing agents) cooperate with each other to achieve network level objectives. The distributed system and method proposed provides a dynamic decentralized control system whereby traffic routing can be controlled by each of the decentralized intelligent intersection computing agents in the network. Further preferably, in at least some embodiments, the disclosed system and method is network based and not user based, so that the disclosed system is independent of market penetration rate of vehicles. Furthermore, in at least some embodiments, the disclosed system is robust to compliance rate, robust in terms of recovery from incidents on the network and/or the system is highly scalable for expansion.

Figure 1A:
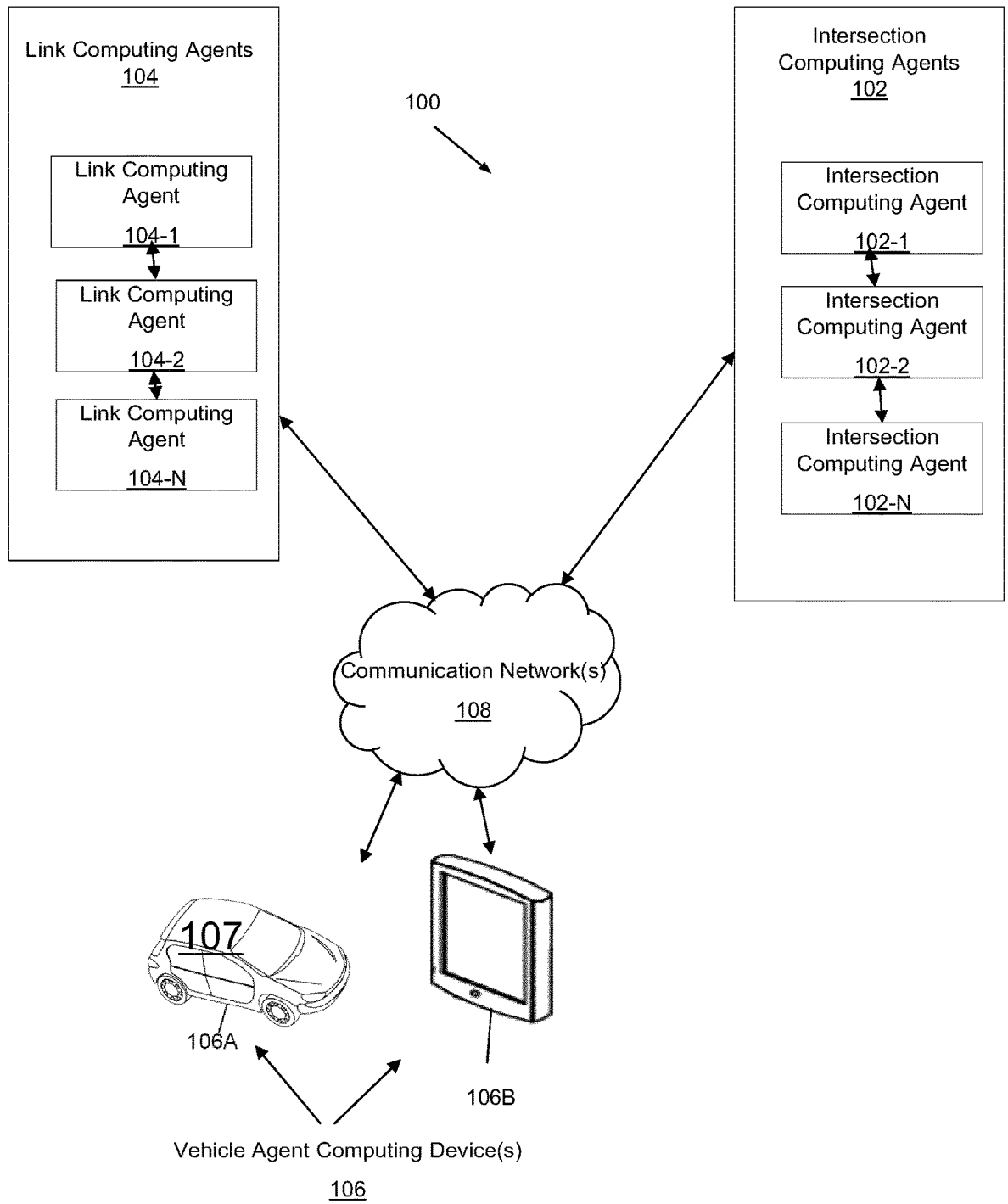
FIG. 1A is a schematic block diagram of a computing system environment for providing dynamic distributed traffic management for vehicles, in accordance with an embodiment.

Referring to FIG. 1A, shown is a block schematic diagram of a computing environment 100 for providing distributed dynamic traffic management using a network of intelligent intersection computing devices, referred to as intersection computing agents 102 (individually 102-1, 102-2 . . . 102-N). The intersection computing agents 102 communicate with one another and to link computing agents 104 (individually link computing agent 104-1, 104-2 . . . 104-N) for collecting real-time traffic information therebetween and providing end-to-end dynamic routing to each vehicle agent computing device 106. The vehicle agent 106 can include connected and autonomous vehicles (CAVs) or connected human driven vehicles (CHV) e.g. 106A, or a portable mobile computing device 106B associated with a moving target (e.g. a pedestrian, a cyclist, or other mode of transportation).

Communication between the intersection computing agents 102-1, 102-2, . . . 102-N and the link computing agents 104-1, 104-2, . . . 104-N occurs via infrastructure to infrastructure (I2I) communications, across communication network 108, including for example, Dedicated short range communication (DSRC), Long-Term Evolution (LTE), 5G, across a network such as the Internet (e.g. across network 108) or other well-known communication standards.

Referring again to FIG. 1A, the communicating network of intelligent intersections 102 with link computing agents 104 (e.g. physical road sensors and/or cameras) allows end-to-end customized dynamic traffic routing for each vehicle agent computing device 106. According to the system 100, intelligent vehicles (e.g. 106A) do not have a full view of the road network and they are instead guided from one intersection to another (e.g. intersection 103A to 103B of FIG. 1B) by a network of communicating intelligent intersection computing agents 102 (e.g. 102-1 with 102-2 . . . 102-N). Intelligent intersection computing agents 102 on the other hand have an integrated and coherent view of the network at each point in time using information they receive from each other and from corresponding links (e.g. link computing agents 104) through infrastructure-to-infrastructure (I2I) communication.

Referring again to FIG. 1A, the following provides example computer implementations of each of the intersection computing agents 102, link computing agents 104, and vehicle agent computing device 106.

Vehicle agent computing agents 106: Examples can include but are not limited to: connected human driven vehicles (CHV) or connected and autonomous vehicles (CAVs). In the case of CAVs, then the vehicles comprise an on-board computer system that allows the vehicles to communicate and process data, other computer components include: GPS, user interfaces and sensors to navigate the road. CAVs (e.g. 107) using computing device 106A are operable to communicate with intersection computing agents 102 through a communication network, e.g. 108 such as either 5G connection, dedicated short range communication or other known communication. In the example of the vehicle agent computing devices 106 being connected human driven vehicles, then there is a computer having a processor and a memory and an interface on-board a vehicle (e.g. vehicle 107) or a software application (e.g. a software application present on a mobile computing device vehicle agent computing device 106B) which allows drivers to communicate with the intersections, via the intersection computing agents 102. Both types of vehicles, via their respective traffic management computing devices referred to as vehicle agent computing devices 106, whether an integrated system or a portable computing system only communicate with intersection computing agents 102 upon arriving at an intersection (the intersection associated with the relevant intersection computing agent 102). As will be discussed with reference to FIG. 6, the vehicle agent computing device 106 is configured to announce their requested destination for the vehicle and request the next node on the path to their destination from the local intersection via the intersection computing agent 102.

Link computing agents 104: Example of a link is a road length between two consecutive intersections. The links can include one or more sensors along the length of the road that can detect vehicles (e.g. 107) travelling on the link and collect GPS information from the vehicles travelling thereon. One example implementation of the link computing agent 104 comprises a customized sensor(s) located on a link that can detect MAC address of mobile devices located in a vehicle passing on the link and detected by the sensor and based on said detection determine speed and movement of vehicles (e.g. 107) (see operation 400 in FIG. 4 and steps 404 and 406). The link computing agents 104, can in addition to sensors also comprise, camera and/or loop detectors located on each road for further detection and sensing means (e.g. see step 404 in FIG. 4). The link computing agent 104 can further comprise one or more roadside unit(s) (RSU) that comprises a processor, a memory and communication means to collects the sensed vehicle information from different detecting devices (e.g. sensors, cameras, loop detectors and other detection means) and communicate the vehicle information to the downstream intersection computing agent 102.

Figure 2:
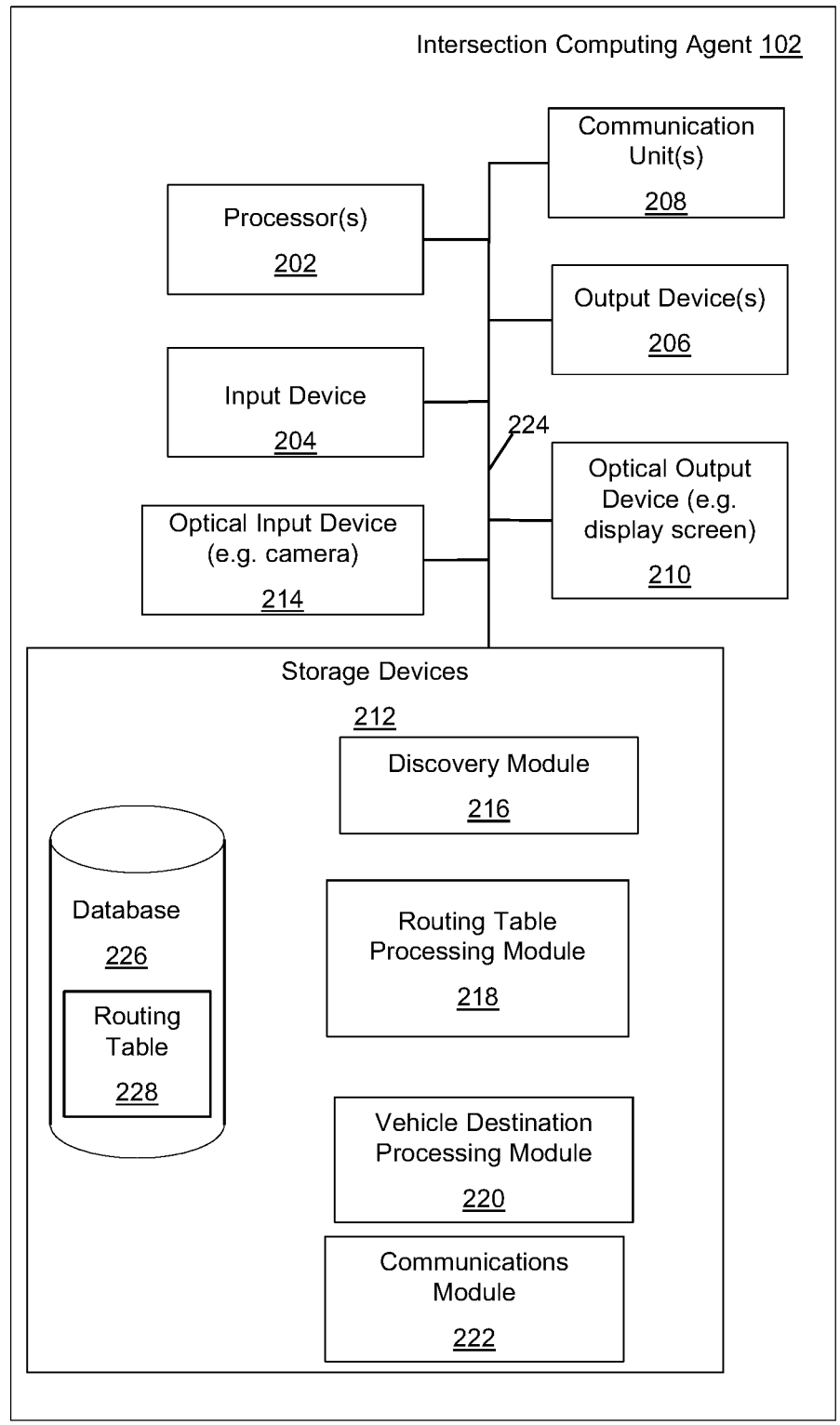
FIG. 2 is a schematic block diagram of an intersection computing agent of FIGS. 1A and 1B, in accordance with an embodiment.

Intersection computing agent 102: An example of an intersection computing agent 102 is a computing device (e.g. a portable computer, a personal computer) as shown in FIG. 2 which is located at an intersection, and can include: a road side unit (RSU), a Raspberry Pi unit or other computing device envisaged. The intersection computing agent (e.g. 102-1) located at an intersection is capable of communicating with vehicle agent computing devices 106, other intersections (e.g. 102-2 . . . 102-N) and link computing agents 104 such as RSUs through communication protocols such as 5G or DSRC. As shown in the example operation 500 of FIG. 5, each intersection computing agent (e.g. 102-1) is configured to communicate with its local in-links (links coming into an intersection) via their link computing agents 104 to retrieve the respective link state (e.g. number of vehicles, average speed). As well, the intersection computing agent (e.g. 102-1) is configured to communicate with other intersections via their intersection computing agents (e.g. 102-2) to receive intersection data to generate network wide travel time (e.g. see step 524 of FIG. 5). The intersection computing agent 102-1 is also configured to communicate with vehicles (e.g. 107) (e.g. local vehicle(s) arriving at the intersection for intersection computing agent 102-1) to obtain their destination (e.g. see step 532 in FIG. 5) and guide the vehicle to next intersection on their path to their destination (e.g. by providing a routing table specific to the vehicle such as at step 528 and 530 of FIG. 5). The intersection computing agent 102 is further preferably configured, to perform at least two types of computations at each intersection. First, travel time calculations are performed based on information it receives from its upstream links (via their intersection computing agents 102 and/or link computing agents 104) such as that performed in step 512 of FIG. 5 and routing table computation, as performed in step 524 and 528 of FIG. 5. In at least one aspect, the intersection computing agent 102 is further configured to communicate between link (e.g. via link computing agents 104) and intersections (e.g. via intersection computing agents 102) and among intersections (e.g. via intersection computing agents 102) occur at predetermined intervals, for example 60 seconds. In one aspect, a particular intersection computing agent (e.g. 102-1) is further configured to communicate with vehicles (e.g. 107) via, vehicle agent computing device 106, as soon as the vehicle arrives at an intersection for the intersection computing agent 102-1 (see operation 600 at FIG. 6 and step 532 of FIG. 5).

Figure 1B:
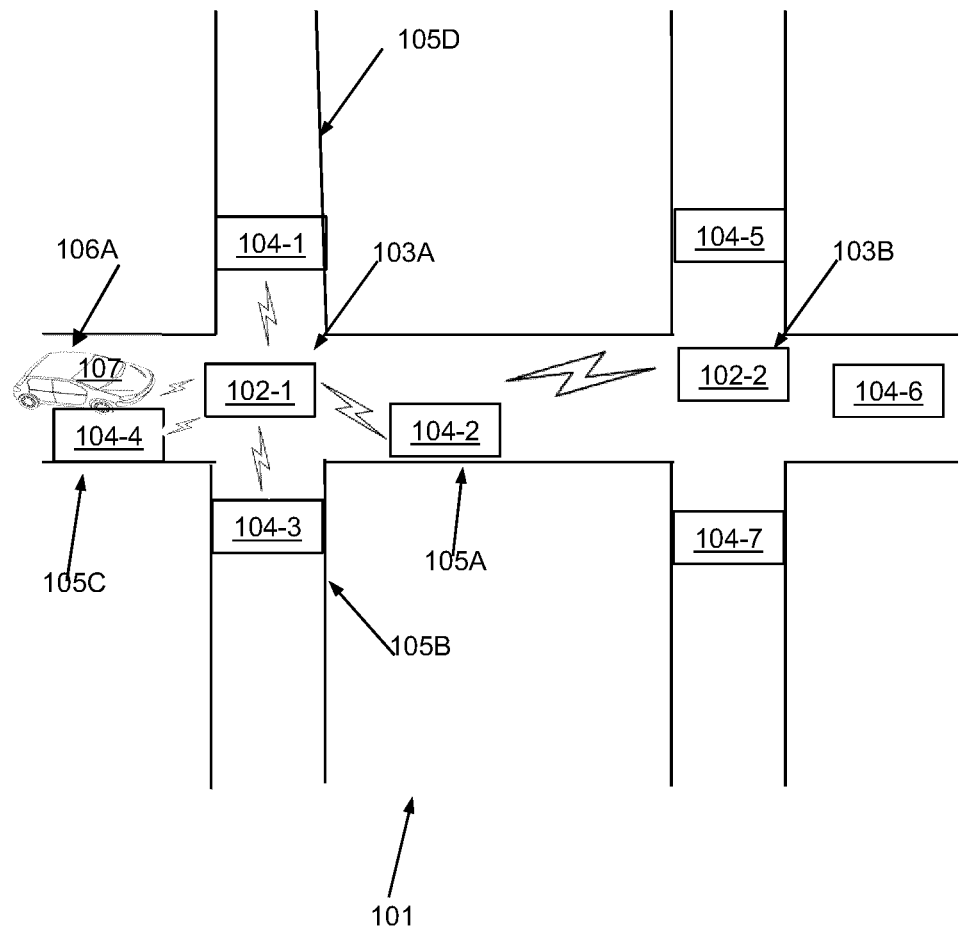
FIG. 1B is a schematic example diagram of an environment depicting implementation of the distributed traffic management system of FIG. 1A and example intersections and links considered for routing a car travelling in the example environment, in accordance with an embodiment.

Referring now to FIG. 1B, shown is an example schematic environment 101 showing an implementation of the distributed traffic management system of FIG. 1A applied to a few sample intersections on a physical road network. Referring to FIGS. 1A and 1B, when a vehicle agent computing device 106A (e.g. CAV) reaches an intersection 103A, it declares its destination to the corresponding intersection computing agent 102-1, using vehicle to interface communication methods (e.g. 5G connection, Bluetooth, dedicated short range communication or other known communications including across communication network 108). As will be described herein, based upon receiving a customized routing table developed at a respective local intersection computing agent 102-1, the vehicle associated with the vehicle agent computing device 106A is routed to the next intersection (e.g. intersection 103B) towards its destination in such a way that traffic is evenly distributed using full capacity of the road network and reducing congestion. As will be discussed herein, the routing table (see routing table 228 in FIG. 2 and steps 524, 526 and 528 of FIG. 5) is generated by a local intersection computing agent 102-1 communicating with other neighboring intersection computing agents 102-2 at other intersections 103B and each intersection computing agent 102 communicating with its respective associated link computing agents 104 (e.g. 102-1 communicating with link computing agents 104-1, 104-2, 104-3 and 104-4 of associated links 105A, 105b, 105C, and 105D and 102-2 communicating with links computing agents 104-5, 104-6, 104-7, 104-2).

Referring to FIGS. 1A and 1B, in the disclosed traffic management system, shown in environments 100 and 101, real-time traffic information is collected by each of the road links using sensing mechanisms (e.g. sensors and/or cameras) on the link computing agents 104 present on the links 105A-105D and being exchanged among intelligent intersections (e.g. 103A and 103B) using infrastructure to infrastructure (I2I) communication. One example advantage of the environments 100 and 101 in at least some embodiments is that there is no dependency on market penetration rate and vehicle communication characteristics (e.g. 106A and 106B). In this case, an example advantage is that with drivers no longer being decision makers, the disclosed distributed dynamic traffic management routing system shown in FIGS. 1A and 1B is able to guide vehicles (e.g. 107) to routes that reduce congestion and maximize capacity without worrying about driver's individualistic behavior.

Referring again to FIG. 1A, the distributed traffic management system shown as computing environment 100 providing end-to-end dynamic routing of vehicles (e.g. 107) including connected automated vehicles (CAV) is also shown as an example implementation in FIG. 1B. Preferably, in at least some embodiments and referring to FIG. 1A, there are at least two network layers and at least two types of agents envisaged. The at least two network layers include: an information communication network where the information exchange between vehicles (e.g. vehicle agent computing devices 106), links (e.g. link computing agents 104) and intersections (e.g. intersection computing agents 102) takes place (e.g. via at least one communication network 108), and a physical road network where vehicles (e.g. vehicle 107) travel on. Physical road network can also be represented by a graph of G (I, L), which consists of I intersections (nodes/vertices) (e.g. intersections 103A, 103B in FIG. 1B) and L links (edges) (e.g. links 104-1, . . . 104-7 in FIG. 1B).

Furthermore, any additional network layers (e.g. shared mobility service layer) can be easily accommodated on top of the foregoing two layers.

As discussed, the two types of agents in the information network layer can include: vehicle agent computing devices 106 such as connected and autonomous vehicles (CAV) agents (v∈V), and infrastructure agents which can include:
 a. link agents (l∈L) and
 b. Intelligent intersection agents ($I_i^2 \in I^2$)

In addition, there are at least two types of communications in the system of FIGS. 1A and 1B: two-way vehicle-to-infrastructure (V2I) communication and infrastructure-to-infrastructure communication (I2I) taking place over dedicated short-range communication (DSRC), LTE, 5G, or other well-known communication standards. Other types of agents (e.g. pedestrians and cyclists) having a computing device with processor and a memory to communicate with and receive traffic routing instructions from link computing agents 104, and intersection computing agents 102 as discussed with reference to FIG. 1A, e.g. as shown as mobile device 106B can also be envisaged.

FIG. 2 is a block schematic diagram of an intersection computing agent or device 102 of FIG. 1A in accordance with an embodiment. As illustrated, the intersection computing agent 102 comprises one or more processors 202, one or more input devices 204, as well as an optical input device 214. Input devices may be a keyboard, a key pad, buttons, pointing device, microphone, etc. The optical input device 214 may comprise a camera or an IR sensor (receiver). If the optical input device is an IR sensor, one of the input devices may be a camera. Intersection computing agent device 102 comprises one or more output devices 206 as well as an optical output device 210. Output devices may include a speaker, light, bell, vibratory device, etc. An optical output device 210 may be a display screen. It is understood that optical output device 210 such as a display screen used in intersection computing agent device 102 may be configured as an input device as well, for example, a gesture based device for receiving touch inputs according to various known technologies (e.g. in relation to input capabilities: resistive touchscreen, a surface acoustic wave touchscreen, a capacitive touchscreen, a projective capacitance touchscreen, a pressure-sensitive screen, an acoustic pulse recognition touchscreen, or another presence-sensitive screen technology; and in relation to output capabilities: a liquid crystal display (LCD), light emitting diode (LED) display, organic light-emitting diode (OLED) display, dot matrix display, e-ink, or similar monochrome or color display).

The intersection computing agent device 102 further comprises one or more communication units 208 (e.g. Antenna, induction coil, external buses (e.g. USB, etc.), etc.) for communicating via one or more networks (e.g. network 108) to one or more other computing devices, e.g. other intersection computing agents 102, link computing agents 104, and vehicle agent computing devices 106.

The intersection computing agent device 102 further comprises one or more storage devices 212. The one or more storage devices 212 may store instructions and/or data for processing during operation of the device 102. The one or more storage devices may take different forms and/or configurations, for example, as short-term memory or long-term memory. Storage devices 212 may be configured for short-term storage of information as volatile memory, which does not retain stored contents when power is removed. Volatile memory examples include random access memory (RAM), dynamic random access memory (DRAM), static random access memory (SRAM), etc. Storage devices 212, in some examples, also include one or more computer-readable storage media, for example, to store larger amounts of information than volatile memory and/or to store such information for long term, retaining information when power is removed. Non-volatile memory examples include magnetic hard discs, optical discs, floppy discs, flash memories, or forms of electrically programmable memory (EPROM) or electrically erasable and programmable (EEPROM) memory.

Storage devices 212 store instructions and/or data for the intersection computing agent device 102. Said instructions, when executed by the one or more processors 202, configure the device 102 to perform various operation as described herein (e.g. operations 500 shown in FIG. 5). Instructions may be stored as modules such as a discovery module 216 for discovering neighboring intelligent intersection computing agents 102 (e.g. sending out broadcast messages over the communication network via communication units 208 to check whether there are other intersections in its vicinity and determining a set of intersections located respectively downstream and upstream of the intersection for the intersection computing agent 102); routing table processing module 218 (e.g. for processing local link average travel time for links local to its intersection; receiving average link travel times from neighboring intersections via neighboring intersection computing agents 102 including downstream links information and creating a routing table 228 stored in a database 226 containing network travel time to neighboring intersections from current intersection) and a vehicle destination processing module 220 (e.g. to receive vehicle destination information for a first vehicle and customizing the routing table 228 to provide an on-demand routing table 228 to the first vehicle). Communications module 222 may provide communications capabilities using communication units 208 to communicate with network 108 and/or other computing devices 102, 104, 106, in FIG. 1A, in a local or peer-to-peer network (not shown). Other modules are not shown such as an operating system, etc.

Communication channels 224 may couple each of the components 202, 208, 206, 204, 210, 214, 212 and 226 for inter-component communications, whether communicatively, physically and/or operatively. In some examples, communication channels 224 may include a system bus, a network connection, an inter-process communication data structure, or any other method for communicating data.

In the examples herein, the intersection computing agent device 102 can be a roadside unit, a Raspberry Pi unit, a computer server, a tablet computer, a laptop computer, a tabletop computer, a personal computer or workstation or another type of computing device.

Figure 3:
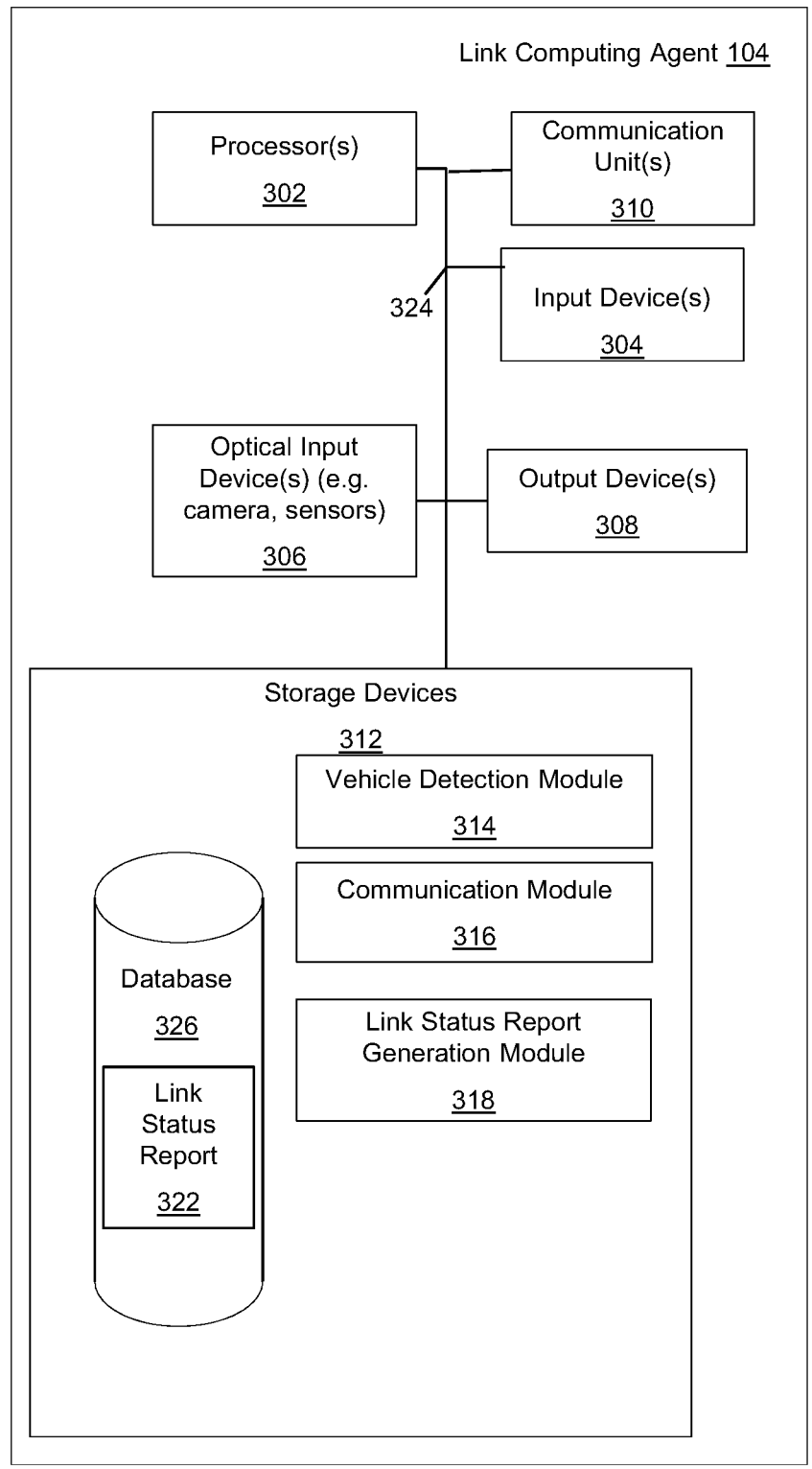
FIG. 3 is a schematic block diagram of a link computing agent of FIGS. 1A and 1B, in accordance with an embodiment.

Referring to FIG. 3 shown is a block schematic diagram, showing example components of a link computing agent 104 of FIG. 1A, in accordance with an embodiment. As discussed herein, the link computing agent 104 is configured to use one or more optical input devices such as sensing mechanisms 306 (e.g. sensors, cameras, and/or loop detectors) to detect whether there are any vehicles (e.g. 107) travelling on a particular link/and to determine average speed for each link associated with the link computing agent 104 (see example operations 400 of FIG. 4). Link computing agent device 104 comprises one or more processors 302, one or more input devices 304 as well as, optionally, an optical input device 306 (e.g. cameras, sensors, . . . ). Input devices 304 may be a keyboard, key pad, buttons, pointing device, microphone, etc. In one example, the optical input device 306 may comprise a camera or an infra-red (IR) sensor (receiver). Link computing agent 104 may comprise one or more output devices 308. Output devices 308 may include a speaker, light, bell, vibratory device, optical output device (e.g. a display screen) etc.

Similar to intersection computing device 102, the link computing agent 104 may comprise one or more communication units 310 (e.g. Antenna, induction coil, external bus connectors (e.g. USB, etc.), etc.) for communicating with other computing component(s) (e.g. other link computing agents 104, intersection computing agents 102, and vehicle agent computing devices 106) such as via one or more networks (e.g. 108 in FIG. 1A) via communication channels 324. In some examples, communication channels 324 may include a system bus, a network connection, an inter-process communication data structure, or any other method for communicating data.

Link computing agent 104 further comprises one or more storage devices 312. The one or more storage devices 312 may store instructions (for execution by the processor(s) 302) and/or data for processing during operation of link computing agent 104 for generating link status reports 322 for storage in a database 326. The one or more storage devices may take different forms and/or configurations, such as described with reference to FIG. 2.

Figure 4:
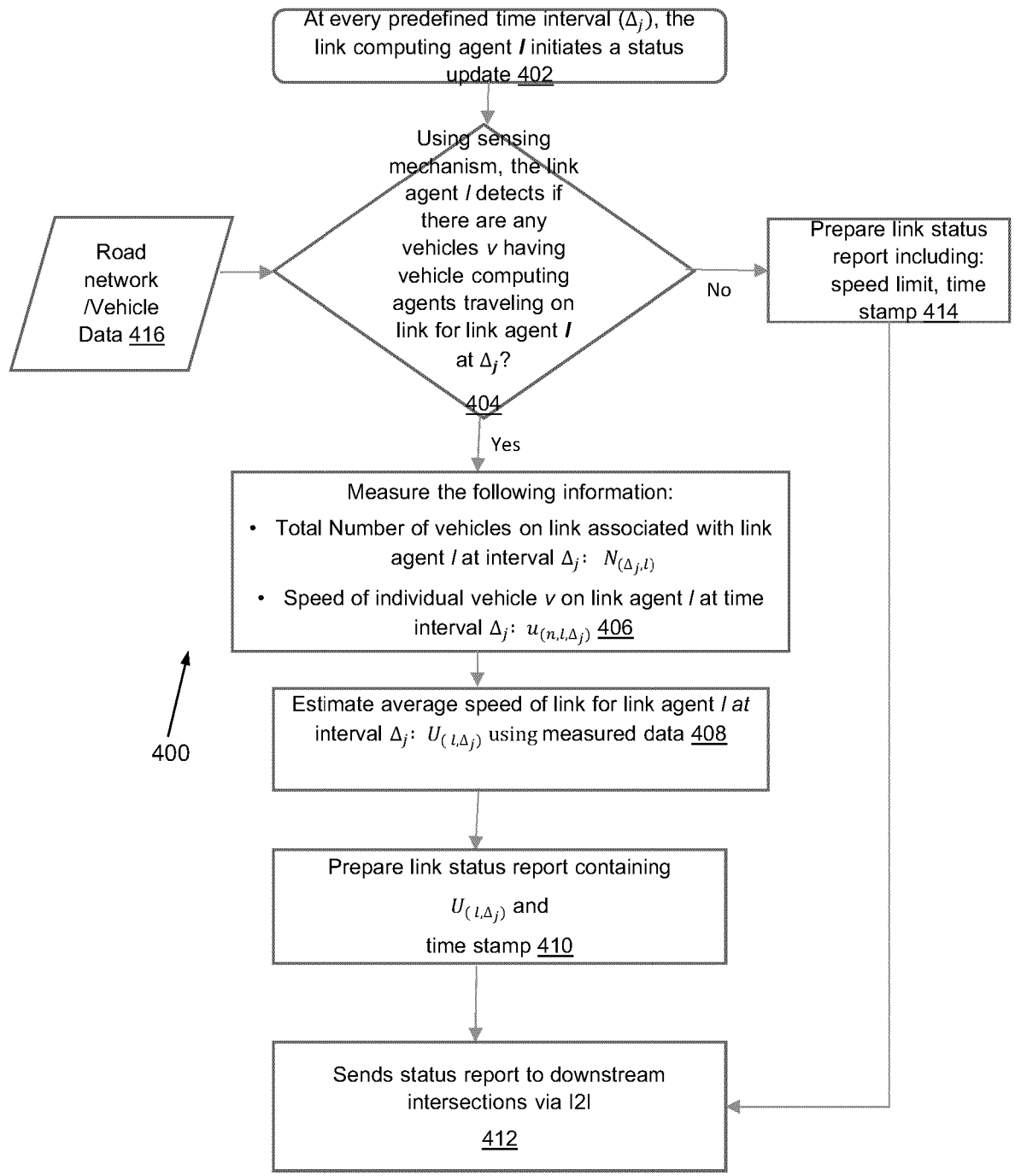
FIG. 4 is a flowchart showing example operations of the link computing agent for the computing system environment of FIG. 1A, in accordance with an embodiment.

Storage devices 312 store instructions and/or data for link computing agent 104, which instructions when executed by the one or more processors 302 configure the link computing agent 104, as described herein (e.g. operations 400 shown in FIG. 4). Instructions may be stored as modules such as a vehicle detection module 314 for receiving input from input devices 304 and/or 306 (e.g. GPS information) to detect vehicle identification and travel information (e.g. total number of vehicles detected on a particular link, speed of each individual vehicle on the link, identification for each of the vehicles travelling on the link, precise location of each vehicle on the particular link) for each of the vehicles having vehicle agent computing devices 106 travelling on a particular link for the link computing agent 104. In one example aspect, the vehicle detection module 314 may be configured to detect MAC addresses of mobile devices in vehicle agent computing devices 106 to develop speed and movement of vehicles. Instructions may also be stored as link status report generation module 318 which is configured to calculate average speed of the particular link for the link computing agent 104 using the measured data provided by the vehicle detection module 314 and generate the link status report 322 which is configured for communications via communications module 316 to communicate with communications unit 310 and external computer components such as the intersection computing agents 102 and/or vehicle agent computing devices 106.

Referring to FIG. 4 shown is an example flowchart of operation 400 of link computing agents 104, such as within the environment 100 of FIG. 1A. Referring to FIGS. 3 and 4, each link computing agent 104 comprises at least one processor 302 (see FIG. 3) in communication with at least one memory (e.g. storage devices 312), at least one input device (e.g. camera, sensors, proximity sensor and/or other vehicle detection means, shown as input devices 304 and 306 in FIG. 3) and at least one communication subsystem (e.g. communication unit 310). The at least one memory (312) stores instructions, which when executed by the at least one processor 302, configure the link computing agent 104 to perform operations, including operations 400.

Link computing agents (l) 104

Generally, each of the link computing agents 104 have the ability to sense, communicate and estimate, but not actuate. Each link has one upstream intersection (travelled from) and one downstream intersection (to).

Referring to FIG. 4, at step 402, periodically at time interval $\Delta j$, the link computing agent 104 initiates a status update request. At step 404, the link computing agent 104, detects road and vehicle data 416 via its sensing and communication computer components (e.g. 306, 304, 308, 310, 302) first determines whether there are any vehicles (e.g. vehicle 107 or vehicle associated with computing device 106B) which are travelling on a particular link l having a link computing agent 104. If that is the case, at step 406, the link computing agent 104, collects information from vehicles (e.g. 107) e.g. CAVs, including but not limited to: total number of vehicles on link l at interval $\Delta_j$: $N_{(\Delta_j, l)}$; speed of individual vehicle v on the link for link agent l at time interval $\Delta_j$: $u_{(n, \, l, \, \Delta_j)}$; location of each of the vehicles (e.g. 106A, 106B) that are located on or proximal to the link for link agent l. Using this measured information from step 406, at step 408, the link computing agent calculates the average speed of traffic movement of the link l for the link computing agent 104. The information from steps 406 and/or 408 is then used to create a link status report (e.g. link status report 322 in FIG. 3) to be sent to downstream (or in other examples, neighboring intersections) intersection(s) and their associated intersection computing agents 102, via 121 (intersection to intersection) communication. The link status report (e.g. 322) generated by the link computing agent 104 which is sent to each intersection computing agent 102 at downstream intersection(s) may contain the following information: total number of vehicles detected by the particular link computing agent 104 at link l: $N_{(l,\Delta_j)}$ and average speed on the particular link for link computing agent l: $U_{(l,\Delta_j)}$.

Note that if at step 404, no vehicles are detected, then a link status report containing speed limit, time stamp for the respective link(s) are generated.

Figure 5:
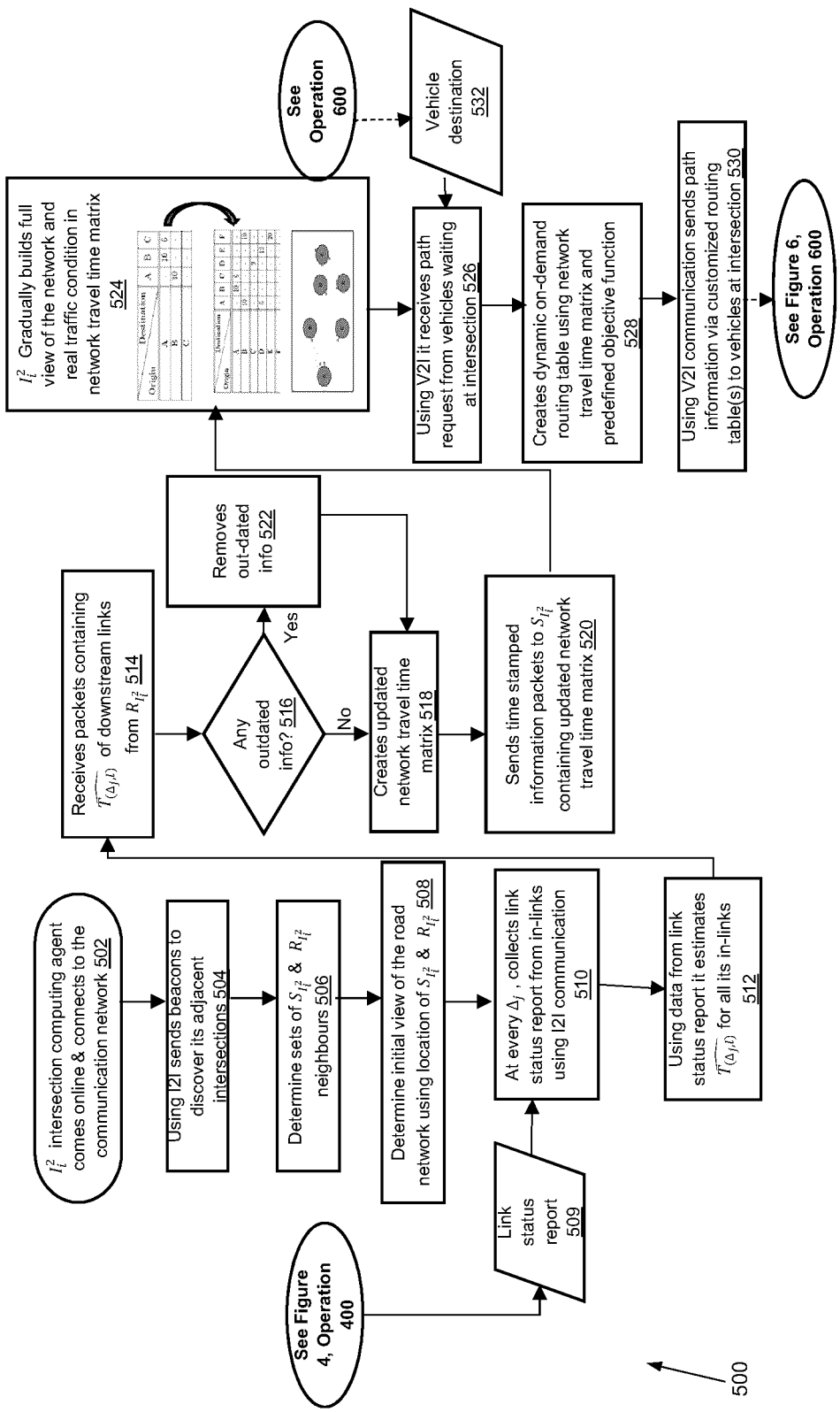
FIG. 5 is a flowchart showing example operations of the intersection computing agent for the computing system environment of FIG. 1A, in accordance with an embodiment.

Referring to FIG. 5 shown is an example flowchart of operation 500 of intersection computing agents 102, such as within the environment 100 of FIG. 1A. Referring to FIGS. 2 and 5, each intersection computing agent 102 comprises at least one processor 202 (see FIG. 2) in communication with at least one memory (e.g. storage devices 212), and at least one communication subsystem (e.g. communication unit 208). The at least one memory stores instructions, which when executed by the at least one processor 202, configure the link computing agent 102 to perform operations, including operations 500. Various embodiments of the operation 500 can be included in a computer program product embodied in a non-transitory computer readable medium that includes code executable by one or more processors.

Intelligent Intersection Computing Agents ($I_i^2$) 104

Generally, and according to one or more embodiments, each individual intelligent intersection computing agent 104 as shown in FIGS. 1A and 1B, which is located at an intersection, is configured to sense, communicate, estimate and actuate. Each intersection computing agent 104 can communicate with vehicles (e.g. 107) and their vehicle agent computing devices 106 via vehicle to intersection communication (V2I) as well as with other intersections and link agents via intersection to intersection (I2I) communication. The network of connected intersection computing agents (e.g. 104-1, 104-2, . . . 104-N) as shown in FIGS. 1A and 1B located at intersections creates a distributed control system, with ability to respond to the changes in the network in real time. Preferably, intelligent intersection computing agents 102 are operable to maximize throughput of vehicles and traffic and minimize total travel time for a vehicle. With reference to FIGS. 1A, 1B and 5, the functionality of each intersection computing agent 102 includes:

1. Neighbourhood Discovery

Initially, since the disclosed computing environment (e.g. 100 and 101) is a distributed control system with no centralized traffic management center, when an individual intelligent intersection computing agent (e.g. 102-1) at an intersection comes online and connects to the communication network 108, it is only aware of its own position and has no view of the overall network (e.g. computing environment 100). As can be seen at a subsequent step in FIG. 5, as time passes (see step 524), the intersection computing agent 102-1 gradually builds the whole view of the network G(I, L) from the information it receives from its neighboring intersection computing agents (e.g. 102-2) at neighboring intersections (e.g. intersection 103B) and associated links (e.g. 104-5, 104-6, and 104-7).

Referring to step 504, once the particular intersection computing agent (e.g. 102-1) is online at step 502 (e.g. connected to the communication network 108 or to another network to communicate with other computing components of FIG. 1A), it sends out broadcast messages (e.g. using infrastructure to infrastructure communication) over the communication network 108 to check whether there are any other intersections in its vicinity. For example, if two intersections are connected by a link (e.g. see intersection 103A and 103B of FIG. 1B connected by link 105A) they become neighbours. In one aspect, each individual intersection computing agent $I_i^2$, has two sets of neighbours:

$S_{I_i^2}$ is a set of intersections upstream of $I_i^2$, to whom $I_i^2$ sends the information $R_{I_i^2}$ is a set of intersections downstream of $I_i^2$ from whom the information $I_i^2$ receives the information.

Figure 5A:
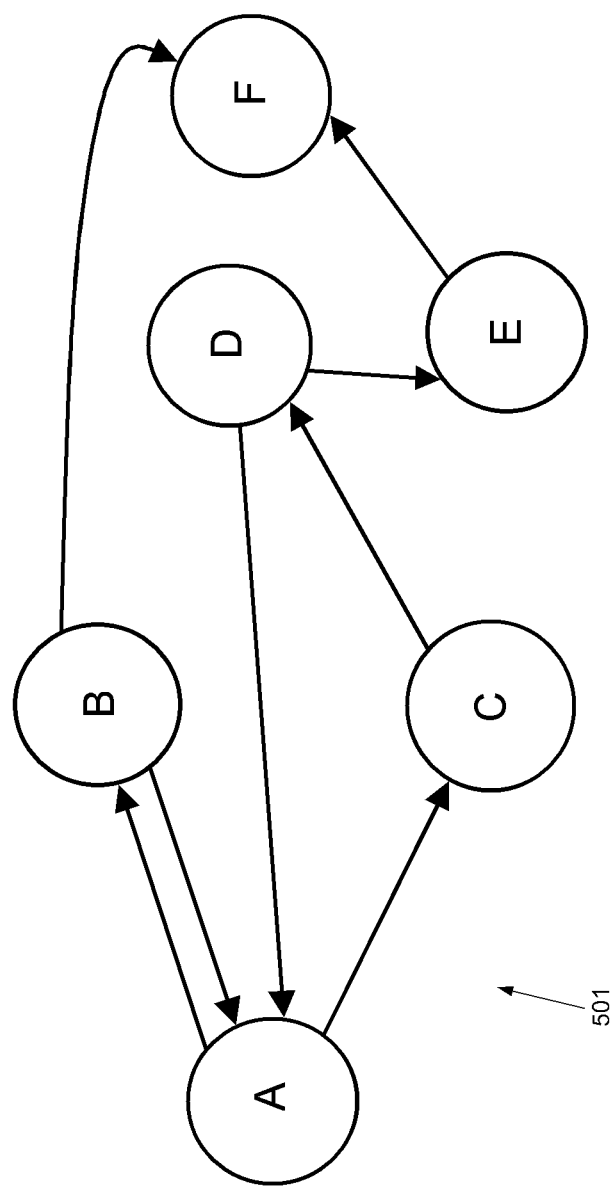
FIG. 5A is an example neighbour network schematic for intersection computing agents for the computing system environment of FIG. 1A, in accordance with an embodiment.

An example neighbour network schematic for intersection computing agents 102 is shown in FIG. 5A. In the example illustrated, the set of receiving and sending neighbours for nodes A & C are as follows: $S_{I_A^2}$=[B, D], $R_{I_A^2}$=[B, C] whereas $S_{I_C^2}$=[A], $R_{I_C^2}$=[D].

Referring now to FIG. 5, at step 506, subsequent to discovering the adjacent intersections and their intersection computing agents 102, the particular intersection computing agent (e.g. 102-1), determines sets of upstream $S_{I_i^2}$ & downstream $R_{I_i^2}$ neighbour intersection computing agents 102 and at step 508, using information obtained at step 504, determine initial view of the road network using location of upstream $S_{I_i^2}$ & downstream $R_{I_i^2}$ intersection computing agents 102 and stores this information.

2. Setting-Up Link Costs

At step 510 and 512, from the link status reports (see step 509 and status report 322 in FIG. 3) received from local in-link computing agents 104, and other information, e.g. a queue table, individual intelligent intersection computing agent (e.g. 102-1) estimates average link cost e.g. travel time $\overline{\tau_{(l,\Delta_j)}}$ for all of its in-links. Other costs could be emissions, fuel consumed etc. All the costs can be summed up by converting them to a monetary value or any other common units. In-links are defined as links coming into the intersection for the particular intersection computing agent $I_i^2$ (e.g. links 105A, 105B, 105C, and 105D coming into intersection 103A having intersection computing agent 102-1). Next at step 514, the intersection computing agent 102-1 is configured to receive packets containing estimated average link travel time $\overline{\tau_{(\Delta_j,l)}}$ of downstream links from its set of downstream neighbor intersection computing agents $R_{I_i^2}$ (e.g. 102-2 in FIG. 1B at intersection 103B).

The intersection computing agent 102-1 at step 516 determines whether there's an outdated information based on link travel times received at step 512 and 514, if so, it removes out-dated information and then proceeds to step 518.

3. Building Link State Information Packets

At step 518, the intersection computing agent 102-1 using information gathered from the previous two steps (neighbor discovery and link travel times) and intersection computing agent 102-1 $I_i^2$ creates network travel time matrices to be sent to its neighboring intersections using information packets. For example, at step 520, the intersection computing agent 102-1 sends time-stamped information packets containing updated network travel time matrix (e.g. travel time on each of its in-links and travel time to each downstream intersection from intersection for agent 102-1) to each of the upstream intersections via their intersection computing agents 102.

An example of information packet built by intersection computing agent $I_A^2$ (e.g. 102-1) from FIG. 5 is as follows:

[D: 5 min; B: 10 min]. This means, from intersection (node) D to node A is 5 minutes and from node B to node A is 10 minutes.

4. Distributing Link State Packets

Referring to step 520, in each time interval $\Delta j$, an intersection (e.g. intersection computing agent 102-1) transmits information packets containing network travel times to downstream intersection to upstream intersections in $S_{I_i^2}$ set.

Subsequently, every intersection receives new information packets from its neighbours who are in set $R_{I_o^2}$.

Therefore, intersection A in FIG. 5A having intersection computing agent 102, will receive information from intersections C & B via their corresponding intersection computing agents 102. An example of information packet received by intersection computing agent $I_A^2$ from neighboring intersection computing agent $I_C^2$ is:

[Estimated travel link distances: A-C: 6 min; C-D: 9 min; D-E: 13 min; E-F: 20 min].

Referring again to the example schematic in FIG. 5A, intersections (nodes) E & F are not directly connected to node C. However, as the time progresses (see operation 500), information packets keep getting passed from one neighbour to another, till every node in network 501 has full view of the network 501 and updated network impedance matrix (I X I) (TABLE 1).

Due to interconnectivity in the network 501, there is a possibility of information overlapped, and oversharing therefore only recent and unique copy of each information packet will be forwarded (see operation 500).

TABLE 1

Origin-Destination Travel Time Matrix

| | Destination | | | | | |
|---|---|---|---|---|---|---|
| Origin | A | B | C | D | E | F |
| A | — | 10 | 6 | — | — | — |
| B | 10 | — | — | — | — | 10 |
| C | — | — | — | 9 | — | — |
| D | 5 | — | — | — | 13 | — |
| E | — | — | — | — | — | 20 |
| F | — | — | — | — | — | — |

5. Computing On-Demand Routing Table

Referring again to FIG. 5, once a vehicle (e.g. 107) having a vehicle agent computing device (e.g. 106A) such as a CAV arrives at intersection associated with $I_i^2$ it announces its destination via input from step 532 via vehicle to intersection communications (V2I) at step 526, and the intersection computing agent $I_i^2$ (e.g. 102-1) using the up to date network travel matrix (e.g. TABLE 1 generated at step 524) will generate, at step 528, a routing table from current intersection having intersection computing agent $I_i^2$ (e.g. 102-1) to the requesting vehicle, e.g. CAVs destination.

Using the routing table and vehicle to intersection communication (V2I), at step 530, the intersection computing agent $I_i^2$ 102-1 guides the requesting vehicle (e.g. 107) to the next intersection (e.g. 103) on the vehicle's path to its destination.

The routing table (e.g. 228 in FIG. 2) generated by operation 500 generally includes contains information such as the next node on the path to destination and time of generation of table. In the case of the traffic network since demand is driven by dynamic activity patterns and varies with the time of the day, the involvement for an intersection is dynamic. As such, an on-demand routing table is created when a vehicle such as, CAV reaches intersection computing agent $I_i^2$. The on-demand routing table generated at step 528, may be a subset of the network travel time matrix generated at step 524 and is tailored to the destination for the vehicle as provided at 532.

An example of routing table generated by the intersection computing agent, e.g. via operations 500, for the sample network 501 in FIG. 5A, is presented in TABLE 2.

TABLE 2

Routing Table for Node A

| Destination | Travel Time (minute) | Next Node |
|---|---|---|
| F | 20 | B |
| D | 15 | C |

Referring again to the operations in FIG. 5, the nature of the path generated in routing table at step 528 depends on the objective of the controller (e.g. intersection computing agent 102), it can be shortest path or system optimal path or eco-routing. In one example, the intersection computing agent 102 may be configured for a particular objective when generating the routing table at step 528. In one aspect, the objective can be optimizing system travel time (e.g. environment 100), individual travel times, roadside green house gas emissions, or any combination. These pre-defined objectives can be provided manually, automatically or semi-automatically by the traffic management officials of a city.

Referring to the routing table in TABLE 2, a vehicle currently at A destined to F will be directed to head to B and if necessary, it will be instructed to change lanes. In this manner, the vehicle, e.g. CAV itself does not have the view of the network (e.g. 501 in FIG. 5) and only knows its origin node and the destination node.

Figure 6:
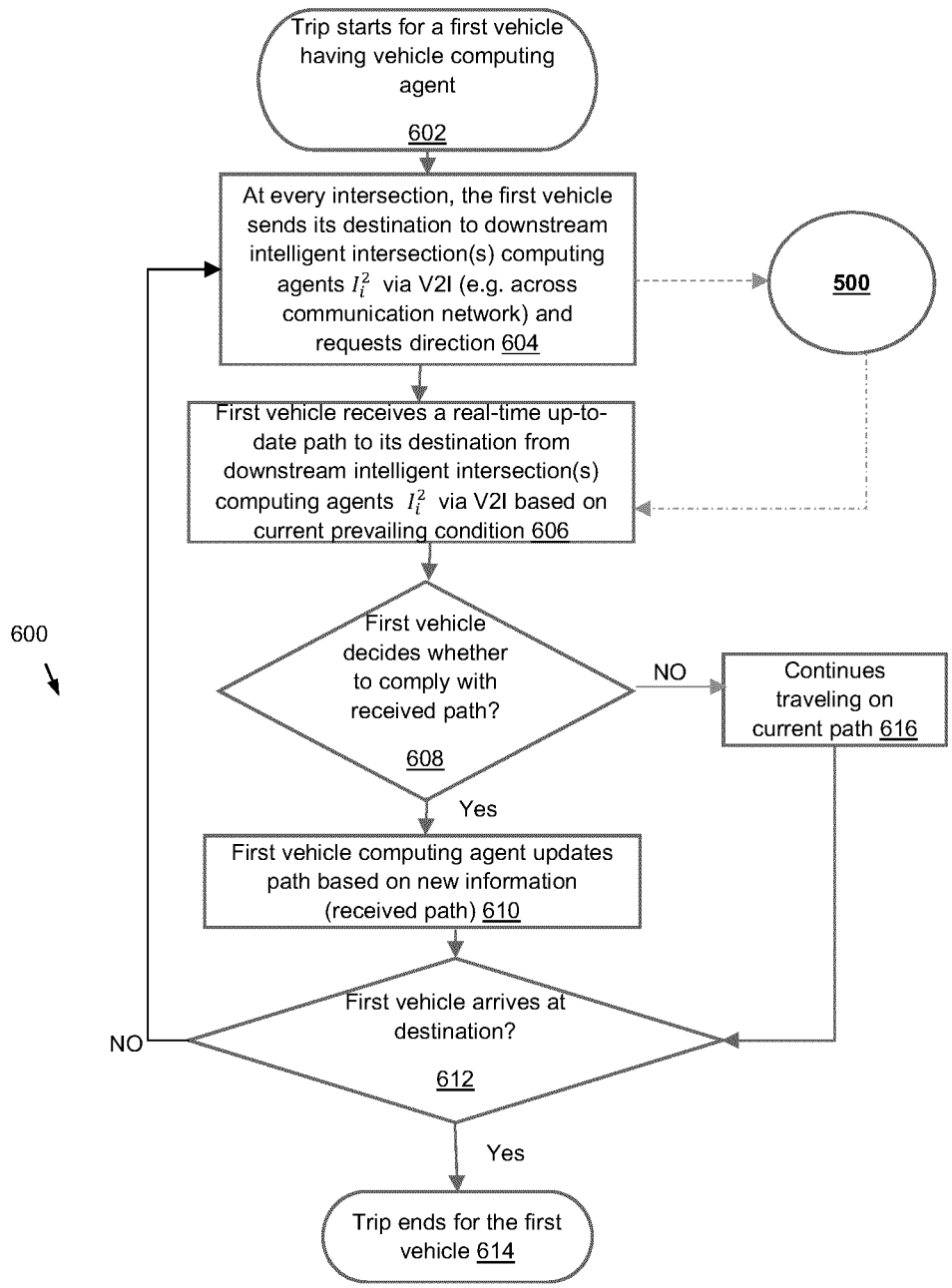
FIG. 6 is a flowchart showing example operations of the vehicle agent computing device of FIG. 1A, in accordance with an embodiment.

Referring to FIG. 6 shown is an example flowchart of operation 600 of vehicle agent computing devices 106, such as within the environment 100 of FIG. 1A. Referring to FIG. 6, each vehicle agent computing device 106 comprises at least one processor in communication with at least one memory, and at least one communication subsystem. The at least one memory stores instructions, which when executed by the at least one processor, configure the vehicle agent computing device to perform operations, including operations 600.

Referring to FIGS. 1A and 6, the vehicle agent computing devices 106 (v) may be connected and autonomous vehicles agents. In one aspect, the vehicle agent computing device 106 are intelligent vehicles that are capable of sensing, actuating and communication. For example, the agents 106 such as CAVs are responsible for all movement related tasks except routing; they are defined by their origin (Ov), destination (Dv), speed (uv) and their location (xv; yv). The agents 106 such as CAV agents do not have a full view of the network (e.g. network 501 in FIG. 5A) as such for routing they solely rely on the instruction given to them by the intelligent intersection computing agents 102 at intersections. Once on a particular link, via link computing agents 104 (e.g. embedded or external road sensors) the vehicle location and speed are communicated to the respective intersection computing device (e.g. intersection computing agent 102). Similarly, once a vehicle agent computing device (106), e.g. CAV agent arrives at an intersection having intersection computing agent $I_i^2$, it communicates its destination to the $I_i^2$ which using the routing table guides the vehicle to the next intersection having neighboring intersection computing agent $I_i^2$ on the path that meets the objective of the controller ($I_i^2$).

At step 602, trip starts for a first vehicle (e.g. 107) having vehicle computing agent (e.g. 106A). At step 604, the first vehicle 107 sends its destination to downstream intelligent intersection(s) computing agents $I_i^2$ via vehicle to interface communications (V2I) (e.g. across communication network 108 in FIG. 1A) and requests direction towards destination. At step 606, first vehicle 107 receives a real-time up-to-date path (e.g. see routing table provided by operation 500 such as table 2) to its destination from downstream intelligent intersection(s) computing agents $I_i^2$ via vehicle to intersection (V2I) based on current prevailing condition.

Based on received routing table, at step 608, the first vehicle, via its vehicle computing agent 106 decides whether to comply with received path. If yes, at step 610, first vehicle computing agent updates path based on new information (received path). If not, at step 616, the first vehicle continues travelling on current path. Subsequently at step 612, it is determined whether the first vehicle has arrived at its destination. If yes, the trip ends for the first vehicle at step 612. If not, then at every intersection, steps 604, 606, 608, 610 is repeated.

Test Results

In one example, the disclosed embodiments were implemented using a computer simulation. The efficiency of the proposed route guidance was tested on a downtown Toronto road network under recurrent and non-recurrent congestion. The example result showed that, for a fully CAV fleet, network throughput rate is 56% higher under proposed systems and methods for distributed and dynamic traffic management using a network of intelligent intersection computing devices communicating compared to traditional dynamic routing. This results in faster network unloading. The disclosed systems and methods in the example implementation reduced travel time by 40% under recurrent traffic condition and by 15% under non-recurrent traffic condition. When testing the disclosed systems and methods with human driven vehicles and automated vehicles (not connected) using traditional pre-trip routing, crowd-sourced navigation (e.g. WAZE™) and the disclosed traffic management system outperformed them in terms of travel time minimization, pollution reduction, throughput maximization.

End users: In one aspect, the proposed system may be of interest to cities interested in implementing smart-cities/smart-mobility concepts. It may be of interest to traffic information providers, traffic management centers, city planners and transportation officials of municipalities. It may also be of interest to car manufacturers as well as telecommunication companies with 5G network.

One or more currently preferred embodiments have been described by way of example. It will be apparent to persons skilled in the art that a number of variations and modifications can be made without departing from the scope of the invention as defined in the claims.

What is claimed is:

1. An intelligent intersection computing agent associated with an intersection for facilitating distributed dynamic traffic management, the intelligent intersection computing agent comprising: a processor, a communication subsystem and a memory, the communication subsystem and the memory each in communication with the processor, the memory storing instructions, which when executed by the processor, configure the intelligent intersection computing agent to:
broadcast a presence of the intelligent intersection computing agent at the intersection to one or more other intelligent intersection computing agents located at one or more neighboring intersections;
receive at predefined time intervals, link information providing a link status report comprising an average speed of a link for each local link connected to the intersection from a set of link computing agents comprising sensors for detecting vehicles on each said local link;
determine a first average estimated travel time for each said local link from said link information;
receive, in response to said broadcast, from selected ones of said other intelligent intersection computing agents and located downstream of said intersection at one or more downstream intersections, a second average estimated travel time for downstream links associated with each said downstream intersection; and
calculate a routing table providing a route from said intersection to each one of said neighboring intersections based on said first estimated average travel time and said second average estimated travel time.

2. The intelligent intersection computing agent of claim 1, further configured to:
in response to the broadcast: receive identification information from the one or more neighbouring intersections and associated link computing agents and determine therefrom a set of upstream and a set of downstream neighbour intersection computing agents to determine a view of a road network using location information provided in the response of each of the upstream the downstream neighbour intersection computing agents.

3. The intelligent intersection computing agent of claim 1, wherein the average speed of the link is determined by the link computing agents based on a total number of the vehicles on the link at a first time interval and a speed of each of the vehicles on the link for the respective link computing agent at the first time interval.

4. The intelligent intersection computing agent of claim 3 further configured to communicate via intersection to vehicle communications and receive vehicle destination information for a first vehicle located proximal to the intersection and customizing the routing table to provide an on-demand routing table to the first vehicle based on the vehicle destination information.

5. The intelligent intersection computing agent of claim 3 comprises at least one of: a roadside computer unit, a Raspberry Pi computer unit, a computer server, a tablet computer, a laptop computer, a tabletop computer, a personal computer or workstation.

6. The intelligent intersection computing agent of claim 3 further configured to filter out outdated information from the first estimated average travel time and the second average estimated travel time for determining an updated routing table.

7. The intelligent intersection computing agent of claim 3 further comprising sending time stamped information packets containing the routing table to said one or more downstream intersections for respectively updating one or more routing tables associated with the downstream intersections.

8. The intelligent intersection computing agent of claim 4 wherein the routing table further comprises information relating to a next node on a path to the vehicle destination information and a time of generation of the routing table.

9. The intelligent intersection computing agent of claim 4 wherein the routing table is further modified based on a pre-defined objective for optimizing the routing table, the objective comprising at least one of: system travel time, individual travel times, and gas emissions.

10. A computer implemented method for facilitating distributed dynamic traffic management, comprising:
  broadcasting a presence of an intelligent intersection computing agent at an intersection to other intelligent intersection computing agents located at one or more neighboring intersections;
  receiving at predefined time intervals, link information providing a link status report comprising average speed of a link for each local link connected to the intersection from a set of link computing agents comprising sensors for detecting vehicles on each said local link;
  determining a first average estimated travel time for each said local link from said link information;
  receiving, in response to said broadcast, from said other intelligent intersection computing agents located downstream of said intersection at one or more downstream intersections, a second average estimated travel time for downstream links associated with each said downstream intersection; and
  calculating a routing table providing a route from said intersection to each one of said one or more neighboring intersections based on said first estimated average travel time and said second average estimated travel time.

11. The method of claim 10 wherein in response to the broadcast, the method further comprises: receiving an identification response from the one or more neighbouring intersections and associated link computing agents and determine therefrom a set of upstream and a set of downstream neighbour intersection computing agents to determine a view of a road network using location information provided in the response of each of the upstream the downstream neighbour intersection computing agents.

12. The method of claim 10, wherein the average speed of each local link is determined by the link computing agents based on a total number of the vehicles on the link at a first time interval and a speed of each of the vehicles on the link for the respective link computing agent at the first time interval.

13. The method of claim 12, further configured to communicate via intersection to vehicle communications and receive vehicle destination information for a first vehicle located proximal to the intersection and customizing the routing table to provide an on-demand routing table to the first vehicle based on the vehicle destination information.

14. The method of claim 12, further configured to filter out outdated information from the first average travel time and the second average estimated travel time for determining an updated routing table.

15. The method of claim 12 further comprising sending time stamped information packets containing the routing table to said one or more downstream intersections for respectively updating one or more routing tables associated with the downstream intersections.

16. The method of claim 13 wherein calculating the routing table further comprises including information relating to a next node on a path to the vehicle destination information and a time of generation of the routing table.

17. The method of claim 13 wherein calculating the routing table further comprises modifying based on a predefined objective for optimizing the routing table, the objective comprising at least one of: system travel time, individual travel times, and gas emissions.

* * * * *